US006180034B1

(12) United States Patent
Buck et al.

(10) Patent No.: US 6,180,034 B1
(45) **Date of Patent: *Jan. 30, 2001**

(54) PROCESS FOR MAKING CERAMIC MOLD

(75) Inventors: Gregory M. Buck, Newport News; Peter Vasquez, Gloucester, both of VA (US)

(73) Assignee: The United States of America as represented by the Administrator of the National Aeronatics and Space Administration, Washington, DC (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/162,460

(22) Filed: Sep. 17, 1998

Related U.S. Application Data

(60) Provisional application No. 60/059,402, filed on Sep. 19, 1997.

(51) Int. Cl.[7] .............................. B28B 7/04; B29C 33/40

(52) U.S. Cl. .............................................. 264/39; 264/221

(58) Field of Search ..................... 264/39, 221; 164/518, 164/519

(56) References Cited

U.S. PATENT DOCUMENTS 3,206,810 * 9/1965 Hockin et al. ...................... 164/519
3,339,622 * 9/1967 Horton ................................ 264/221
3,362,463 * 1/1968 Manginelli .......................... 264/221
3,616,840 * 11/1971 Dunlop .................................. 164/26
4,078,035 * 3/1978 Ugata et al. ........................ 264/221
5,159,970 * 11/1992 Burkarth et al. ..................... 264/221
5,266,252 * 11/1993 Buck et al. .......................... 264/221
5,373,891 * 12/1994 Kato et al. ........................... 164/519
5,617,912 * 4/1997 Ballewski et al. ................... 164/517
5,766,329 * 6/1998 LaSalle et al. ....................... 164/519
5,937,932 * 8/1999 Cornie ................................. 164/526

* cited by examiner

*Primary Examiner*—Christopher A. Fiorilla
(74) *Attorney, Agent, or Firm*—Kurt G. Hammerle

(57) ABSTRACT

An improved process for slip casting molds that can be more economically automated and that also exhibits greater dimensional stability is disclosed. The process involves subjecting an investment pattern, preferably made from wax, to successive cycles of wet-dipping in a slurry of colloidal, silica-based binder and dry, powder-coating, or stuccoing, with plaster of Paris or calcium sulfate mixtures, to produce a multi-layer shell over the pattern. The invention as claimed entails applying a primary and a secondary coating to the investment pattern. At least two (2) wet-dipping On in a primary slurry and dry-stuccoing cycles provide the primary coating; and an additional two wet-dippings and dry-stuccoing cycles provide the secondary, or back-up, coating. The primary and secondary coatings produce a multi-layered shell pattern. The multi-layered shell pattern is placed in a furnace first to cure and harden, and then to vaporize the investment pattern, leaving a detailed, high precision shell mold.

13 Claims, No Drawings

PROCESS FOR MAKING CERAMIC MOLD

CLAIM OF BENEFIT OF PROVISIONAL APPLICATION

Pursuant to 35 U.S.C. §119, the benefit of priority from provisional application Ser. No. 60/059,402, with a filing date of Sep. 19, 1997, is claimed for this non-provisional application.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates generally to slip-casting of ceramic articles of manufacture and pressure casting of metal articles of manufacture and more specifically to an improved ceramic shell casting system involving successive wet dipping and dry powder coating, or stuccoing, to produce a multi-layer shell mold for these applications.

2. Description of the Related Art

Aerothermodynamic experimentation of modern fluid dynamic principles in the aerospace industry requires among other things high precision and detail in the fabrication of test models. Scientists and engineers have employed test models fabricated from ceramic materials because they exhibit low heat conductivity; possess relatively low coefficients of thermal expansion (CTE); and are capable of surviving high testing temperatures.

Heretofore, ceramic test models were fabricated either by machining or by casting. Cast models can be replicated easily and inexpensively, thus casting processes are preferable to machining processes.

Slip-casting methods provide superior surface quality, density and uniformity in casting high-purity ceramic materials over other ceramic casting techniques, such as hydraulic casting, since the cast part is a higher concentration of pure ceramic powder with little additives. Ceramic powder is compacted in the slip casting process and sintered or bonded together at high furnace temperatures. A slip is a crowded suspension of fine ceramic powder in a liquid such as water or alcohol with small amounts of secondary materials such as dispersants, surfactants and binders. Early slip casting techniques employed a plaster-of-Paris block or flask mold. The plaster-of-Paris mold draws water from the poured slip to compact and form the casting at the mold surface. This forms a dense cast form removing deleterious air gaps and minimizing shrinkage in the final sintering process.

U.S. Pat. No. 5,266,252 ("the '252 Patent") observed that previous slip casting techniques often did not provide the degree of detail necessary for some wind tunnel testing. Indeed, detailed parts were frequently marred with parting lines or suffered surface damage when removed from the stiff flask mold. The '252 Patent resolved this problem by employing a calcium sulfate bonded refractory mix in a quick setting slurry to form a "shell" mold. The primary advantages of which were the ability to use the lost wax process for net casting and seamless molds. The disadvantages have been that these molds, as well as the plaster of Paris molds, are dimensionally unstable during set-up and that the mold forming process is difficult to automate.

U.S. Pat. No. 4,865,114 ("the '114 Patent") also made use of the shell mold using the calcium sulfate bonded refractory mix in a quick setting slurry for pressure casting of non-ferrous metals. This molten metal casting process used pressure and the high density shell mold to form parts with small channels and high surface detail.

Ceramic shell casting techniques using silica, zirconia and other refractory materials are currently used by the metal parts industry for 'net casting,' forming precision shell molds for molten metal casting. The technique involves a successive wet dipping and dry powder coating or stucco to build up the mold shell layer. The shell casting method in general is known for dimensional stability and is used in many net-casting processes for aerospace and other industries in molten metal casting. Automated facilities use multiple wax patterns on trees, large slurry mixers and fluidic powder beds for automated dipping.

Such a shell casting system would be useful for precision and automation in slip casting, except with current shell casting systems the fired strength is too high for removal from delicate slip-cast ceramic parts and can be troublesome for core removal in even molten metal castings. In addition, current shell casting systems do not draw liquid, or 'slip' properly if used for slip casting.

Accordingly, it is the primary objective of this invention to provide a shell casting technique for slip casting molds that is 5 to 6 times more precise than the prior art with respect to linear change and flatness for slip casting molds.

It is another objective of the present invention to provide a shell casting method that facilitates automated slip-casting of intricate patterns.

It is yet another objective of the present invention to provide a technique for pressure casting of molten non-ferrous metals with its high surface density and useful for core molds with its ease of removal.

SUMMARY OF THE INVENTION

The aforementioned objectives are achieved by combining characteristics of typical ceramic shelling techniques with calcium sulfate or plaster powders in mixture with refractories. The former process provides consistent, thin-wall shell molds which can be used in automated precision net casting, and the later materials have unique properties for ceramic slip casting and pressure casting (e.g. the '252 and '114 Patents).

Similar to ceramic shell casting systems for metal casting, the invention uses at least are slurry containing a colloidal silica-based binder, but is stuccoed with a mixture containing calcium sulfate or plaster in addition to silica, zirconia and other typical shell refractories. It involves a successive wet dipping and dry powder coating or stucco over an investment pattern to build up the shell layer. This is unlike previous techniques for slip mold production which involve a quick setting slurry, or wet application of calcium sulfate-bonded refractory mixtures. The dry application of the calcium sulfate in a layered shell process provides greater precision in mold forming, as it is applied in thin layers and is bonded with the colloidal silica slurry. The prior calcium sulfate bonded slurry, or wet application, distorts as it hardens or crystalizes. Also, the calcium sulfate in the dry form can be stored and used indefinitely without setting. In the wet form the calcium sulfate mixture sets quickly, which is problematic for automated processing (i.e. slurry tanks).

An investment pattern is subjected to successive wet-dippings in a slurry containing a colloidal, silica-based binder and dry, stucco-like coatings with plaster or mixtures of calcium sulfates. Through several cycles of wet-dipping and dry, stucco-coating, a multilayered shell over the pattern is created. The multilayer shell is then taken to high temperatures, initially to harden the shell pattern and then to vaporize the investment, leaving a complete, detailed shell mold. The resulting shell mold, which is a colloidal-silica bonded refractory composite containing calcium sulfate, provides an improved capability for slip casting and pressure casting with easy removal for troublesome core molds.

DETAILED DESCRIPTION OF THE INVENTION

First, an investment pattern was cleaned with a 50/50 solution of 1-1-1 Trichloroethane and alcohol; then rinsed with alcohol; and allowed to dry. The preferred embodiment used an investment pattern of wax. Once dry, the investment pattern was immersed in a wetting solution containing colloidal silica (Nyacol 830) diluted about 50/50 with distilled water and 0.25% wetting conditioner (Victawet 12). The investment pattern was then removed and allowed to drain, without drying completely. The wetting solution facilitated adhesion of the slurry to the investment pattern.

Next, a "primary coating" was applied to the investment pattern. Specifically, the wetted-investment pattern was immersed in a "primary slurry." To ensure complete coverage, the immersed investment pattern was gently rotated. The preferred embodiment of the primary slurry consists of a slurry of colloidal, silica-based binder. The best mode primary slurry was prepared in accordance with the application instructions for a Primcote™ "fused silica/zircon refractory 50/50" binder manufactured by Ransome & Randolph (R&R) of Maumee, Ohio. Application Instructions for Primcote™ Binder are incorporated herein by reference. The investment pattern was then removed from the primary slurry and allowed to drain until a thin, uniform slurry-coating covered the investment pattern. Plaster of Paris or a calcium sulfate mixture was then applied to the slurry-coated investment pattern in a stucco fashion. The preferred embodiments for the calcium sulfate mixture include granular powder 834-566 by U.S. Gypsum of Chicago, Ill., the granularity of which keeps the plaster stucco from aggregating or clumping together; dental plaster, if exceptionally fine thin-walled shell molds are desired; or Ransome & Randolph's R&R 909 calcium sulfate/refractory mix for additional strength. The stucco-coated investment pattern was allowed to dry completely. Complete drying typically resulted within four (4) hours.

The dry, stucco-coated investment pattern was then re-immersed in the aforementioned wetting solution quickly, being careful to avoid soaking the pattern. The wetted, stucco-coated investment pattern was allowed to drain without drying before it was immersed and gently rotated for a second time in the primary slurry. Once the slurry-coated investment pattern was removed and allowed to drain, a second, stucco-like coating of plaster of Paris or calcium sulfate mixture was applied and allowed to dry completely. The best mode for the primary coating entailed two complete cycles of wet-dippings in the primary slurry and dry, stucco-coatings; however, additional cycles of wet-dipping and dry, stucco-coating can be practiced without departing from the spirit and the scope of the appended claims.

To provide additional protection to the primary coating, a secondary coating was applied. This "baclk-up" coating involved two complete cycles of wet-dippings in a "secondary slurry" and dry, stucco-coatings. The secondary slurry substituted R&R's "fused silica refractory" Primcote™ binder in lieu of the "fused silica/zircon refractory 50/50" slurry used in the primary slurry. Here again, additional wet-dipping and dry, stucco-coating cycles can be practiced without departing from the spirit and the scope of the appended claims.

Specifically, the primary-coated investment pattern was immersed in the wetting solution, being careful to avoid soaking it. The wetted, stucco-coated investment pattern was allowed to drain without drying and then immersed and gently rotated in the secondary slurry. Once the slurry-coated pattern was removed and allowed to drain, a third coating of plaster of Paris or calcium sulfate mixture was applied in a stucco fashion and allowed to dry completely. Additional strength was obtained using Ranco-Sil "B" course fused silica grain in lieu of plaster of Paris or the calcium sulfate mixture. Complete drying was effected in about four (4) hours.

The dry, stucco-coated investment pattern was again immersed quickly in the wetting solution and allowed to drain without drying. The wetted, stucco-coated investment pattern was immersed and gently rotated in the secondary slurry; removed and allowed to drain; coated with a fourth layer of the calcium sulfate mixture, plaster of Paris, or Ranco-Sil "B" course fused silica grain; and allowed to dry completely.

Finally, the secondary-coated investment pattern was immersed and gently rotated once again in the secondary slurry; then removed and allowed to dry completely, to produce a multilayered shell over the pattern. No additional stucco layer was applied. The resulting multilayered shell was placed in a furnace and heated at 350 degrees Fahrenheit (° F.) for four (4) hours, to cure and harden. Subsequently, the hardened, multilayered shell was heated at 900° F. until the wax vaporized, to form a shell mold. The shell mold was then removed from the oven and allowed to cool. Once cooled, the shell mold was suitable for slip casting, pressure casting, or molten-metal casting.

Many improvements, modifications, and additions will be apparent to the skilled artisan without departing from the spirit and scope of the present invention as described herein and defined in the following claims.

What is claimed is:

1. A process for making a mold comprising the steps of:

(a) dipping an investment pat at least once in a slurry containing a colloidal, silica-based binder;

(b) coating the slurry-coated investment pattern at least once with a dry-powder mixture comprising calcium sulfate;

(c) drying the dry powder-coated investment pattern to form a layered shell;

(d) curing the layered shell to harden the shell;

(e) pyrolyzing the hardened shell to vaporize the pattern and form the mild; and (f) cooling the mold.

2. A process as given in claim 1 further comprising the steps of:

(a)' cleaning the investment pattern with a 50/50 solution of alcohol and 1-1-1 Trichloroethane; and (a)" rinsing the investment pattern with alcohol before dipping the pattern in the slurry.

3. A process as given in claim 1, wherein the steps of dipping, coating, and drying the investment pattern are repeated once.

4. A process as given in claim 1, further comprising wetting the investment pattern in a solution of colloidal silica and removing the investment pattern to drain the investment pattern without drying before dipping the pattern in the slurry.

5. A process as given in claim 4, wherein the solution of colloidal silica consists of a 50/50 solution of distilled water and a colloidal silica with a 0.25% wetting conditioner.

6. A process as given in claim 1, wherein the colloidal, silica-based binder comprises fused silica/zircon refractory (50/50).

7. A process as given in claim 1, wherein the dry powder mixture comprising calcium sulfate is selected from the group consisting of plaster of Paris, a dental plaster, a calcium sulfate mixture including a granular powder, a calcium sulfate-bonding mixture containing calcinated silica and glass fibers, and a calcium sulfate-bonding mixture containing silica and zirconia.

8. A process as in claim 1 wherein the step of dipping the investment pattern further comprises draining the slurry-coated investment pattern until a thin, uniform slurry coating covers the pattern.

9. A process as given in claim 1, wherein the colloidal, silica-based binder comprises fused silica refractory.

10. A process as given in claim 1, wherein curing the layered shell occurs at a temperature of about 350 degrees Fahrenheit.

11. A process as given in claim 1, wherein pyrolyzing the hardened shell occurs at a temperature of about 900 degrees Fahrenheit.

12. A process for making a mold comprising the steps of:

(a) cleaning an investment pattern with 50/50 solution of alcohol and 1-1-1 Trichloroethane;

(b) rinsing the investment pattern with alcohol;

(c) wetting the investment pattern at least once in a solution of colloidal silica having a wetting conditioner;

(d) removing the wetted investment pattern at least once to drain the pattern without drying;

(e) dipping the wetted investment pattern at least once in a slurry containing a colloidal, silica-based binder and draining the slurry-coated investment pattern until a thin, uniform slurry coating covers the pattern;

(f) coating the slur-coated investment pattern at least once with a dry powder mixture comprising calcium sulfate;

(g) drying the dry powder-coated investment pattern at least once to form a layered shell over the pattern;

(h) curing the layered shell to harden the shell;

(i) pyrolyzing the hardened shell to vaporize the pattern and form the mold; and (j) cooling the mold.

13. A process as given in claim 12 wherein stops (c) through (g) are performed twice.

* * * * *

UNITED STATES PATENT AND TRADEMARK OFFICE

CERTIFICATE OF CORRECTION

PATENT NO. : 6,180,034 
DATED : January 30, 2001
INVENTOR(S) : Gregory M. Buck and Peter Vasquez It is certified that error appears in the above-identified patent and that said Letters Patent is hereby corrected as shown below:

<u>Title page,</u>
Item [57], ABSTRACT,
Line 11, after "(2) wet-dipping", delete the extra word "On"

<u>Column 2,</u>
Line 48, after "the invention uses at least", delete "are" and insert -- one --

<u>Column 3,</u>
Line 64, delete "baclk-up" and insert -- "back-up" --

<u>Column 41,</u>
Line 46, section (a), after "dipping an investment", delete "pat" and insert -- pattern --.
Line 55, section (e), after "and form the", delete "mild" and insert -- mold --.

<u>Column 16,</u>
Line 16, section (f), after "coating the", delete "slur-coated" and insert -- slurry-coating --.

Signed and Sealed this

Twenty-sixth Day of July, 2005

JON W. DUDAS
*Director of the United States Patent and Trademark Office*